(12) United States Patent
Lu et al.

(10) Patent No.: US 11,933,666 B2
(45) Date of Patent: Mar. 19, 2024

(54) STRAY-LIGHT TESTING STATION

(71) Applicant: Waymo LLC, Mountain View, CA (US)

(72) Inventors: Chen David Lu, Campbell, CA (US); Matthew Thomas Daniel Rinehart, San Mateo, CA (US); Joshua Chia Fong Wang, San Jose, CA (US); Michael Shagam, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 18/181,353

(22) Filed: Mar. 9, 2023

(65) Prior Publication Data

US 2023/0213379 A1    Jul. 6, 2023

Related U.S. Application Data

(63) Continuation of application No. 16/373,437, filed on Apr. 2, 2019, now Pat. No. 11,635,326.

(51) Int. Cl.
*G01J 1/02* (2006.01)
*G01J 1/04* (2006.01)
(Continued)

(52) U.S. Cl.
CPC ........... *G01J 1/0238* (2013.01); *G01J 1/0411* (2013.01); *G01J 1/0437* (2013.01); *G01J 1/0488* (2013.01);
(Continued)

(58) Field of Classification Search
CPC .... H04N 17/004; H04N 17/002; H04N 17/00; H04N 5/335; H04N 5/232; H04N 5/225;
(Continued)

(56) References Cited

U.S. PATENT DOCUMENTS

| | | |
|---|---|---|
| 4,102,580 A | 7/1978 | Fletcher et al. |
| 7,579,601 B2 | 8/2009 | Harrison et al. |
| | (Continued) | |

FOREIGN PATENT DOCUMENTS

| | | |
|---|---|---|
| CN | 101144750 | 3/2008 |
| CN | 101452200 | 6/2009 |
| | (Continued) | |

OTHER PUBLICATIONS

Andalibi et al, "Automatic Glare Detection via Photometric, Geometric, and Global Positioning Information," Society for Imaging Science and Technology, Jan. 29, 2017, 77-82(6).

(Continued)

*Primary Examiner* — John R Lee
(74) *Attorney, Agent, or Firm* — Fish & Richardson P.C.

(57) ABSTRACT

Methods, systems, and apparatus, for a stray-light testing station. In one aspect, the stray-light testing station includes an illumination assembly including a spatially extended light source and one or more optical elements arranged to direct a beam of light from the spatially extended light source along an optical path to an optical receiver assembly including a lens receptacle configured to receive a lens module and position the lens module in the optical path downstream from the parabolic mirror so that the lens module focuses the beam of light from the spatially extended light source to an image plane, and a moveable frame supporting the optical receiver assembly including one or more adjustable alignment stages to position the optical receiver assembly relative to the illumination assembly such that the optical path of the illumination assembly is within a field of view of the optical receiver assembly.

20 Claims, 7 Drawing Sheets

(51) Int. Cl.
*G01J 1/44* (2006.01)
*H04N 25/00* (2023.01)

(52) U.S. Cl.
CPC ............... *G01J 1/44* (2013.01); *H04N 25/00* (2023.01); *G01J 2001/4446* (2013.01)

(58) Field of Classification Search
CPC ........ H04N 17/06; H04N 25/00; G03B 43/00; G01J 2001/448; G01J 2001/4446; G01J 1/44; G01J 1/0488; G01J 1/0448; G01J 1/0414; G01J 1/04; G01J 1/0403; G01J 1/0407; G01J 1/0411; G01J 1/0271; G01J 1/02; G01J 1/0214; G01J 1/0238; G01J 1/4204; G01J 1/08; G01J 1/06; G01J 1/0425; G01J 1/0266; G01J 1/0437; B60R 11/04; G01M 11/30; G01M 11/02; G01N 21/00
See application file for complete search history.

(56) References Cited

U.S. PATENT DOCUMENTS

| | | | |
|---|---|---|---|
| 10,558,873 | B2 | 2/2020 | Hernnalyn |
| 10,791,324 | B1 | 9/2020 | Lu et al. |
| 11,330,253 | B2 | 5/2022 | Lu et al. |
| 11,635,326 | B2 * | 4/2023 | Lu .................... G01J 1/0238 250/234 |
| 2005/0213096 | A1 | 9/2005 | Kouris et al. |
| 2006/0192949 | A1 | 8/2006 | Bills et al. |
| 2008/0204711 | A1 | 8/2008 | Harrison et al. |
| 2013/0032705 | A1 | 2/2013 | Armstrong |
| 2013/0147968 | A1 | 6/2013 | Lin |
| 2013/0258323 | A1 | 10/2013 | Kuhn et al. |
| 2014/0132778 | A1 | 5/2014 | Holub |
| 2014/0320658 | A1 | 10/2014 | Pliefke |
| 2015/0015713 | A1 | 1/2015 | Wang |
| 2015/0146016 | A1 | 5/2015 | He et al. |
| 2017/0091941 | A1 | 3/2017 | Atkinson |
| 2017/0177000 | A1 | 6/2017 | Meyhofer et al. |
| 2017/0223279 | A1 | 8/2017 | Mueller |
| 2017/0280135 | A1 | 9/2017 | Shroff et al. |
| 2018/0316832 | A1 | 11/2018 | Gartrell |
| 2019/0293783 | A1 | 9/2019 | Breuer |
| 2020/0033263 | A1 | 1/2020 | Deck et al. |
| 2020/0319022 | A1 | 10/2020 | Lu et al. |
| 2020/0336732 | A1 | 10/2020 | Lu et al. |
| 2020/0382766 | A1 | 12/2020 | Lu et al. |
| 2023/0213379 | A1 * | 7/2023 | Lu ........................ G01J 1/44 250/234 |

FOREIGN PATENT DOCUMENTS

| | | |
|---|---|---|
| CN | 102175431 | 9/2011 |
| CN | 103234734 | 8/2013 |
| CN | 203479497 | 3/2014 |
| CN | 102749184 | 1/2015 |
| CN | 105181303 | 12/2015 |
| CN | 105738295 | 7/2016 |
| CN | 107466475 | 12/2017 |
| CN | 207396016 | 5/2018 |
| CN | 108982061 | 12/2018 |
| EP | 2098849 | 5/2013 |
| EP | 3291552 | 3/2018 |
| KR | 10-2013-0096233 | 8/2013 |
| TW | 200739053 | 10/2007 |
| TW | 200928335 | 7/2009 |
| TW | 201137509 | 11/2011 |
| WO | WO 2012/156131 | 11/2012 |
| WO | WO 2014/159727 | 10/2014 |

OTHER PUBLICATIONS

Archer-soft.com [online], "Security testing for self-driving cars: 5 best practices," Jan. 18, 2019 [retrieved on Apr. 9, 2019], retrieved from: URL<https://www.archer-soft.com/ru/blog/security-testing-self-driving-cars-5-best-practices>, 9 pages.
Bosch-presse.de [online], "Bosch DAS 1000 calibration set: professional adjustment of sensors and cameras of driver assistance systems," Mar. 18, 2018, [retrieved on Apr. 9, 2019], retrieved from: URL<https://www.bosch-presse.de/pressportal/de/en/bosch-das-1000-calibration-set-professional-adjustment-of-sensors-and-cameras-of-driver-assistance-systems-151808.html> 8 pages.
Decision to Grant a Patent in Chinese Appln. No. 202080026345.8, dated Dec. 14, 2022, 6 pages (with English translation).
Electronic.nu [online], "How to perform EMC testing of Autonomous Vehicles," Date, Jan. 18, 2019, [retrieved on Apr. 9, 2019], retrieved from: URL<https://www.electronic.nu/en/2017/09/08/how-to-perform-emc-testing-of-autonomous-vehicles/>, 10 pages.
Extended Search Report in European Appln. No. 20783800., dated Nov. 3, 2022, 8 pages.
International Preliminary Report on Patentability in International Appln. No. PCT/US2020/024940, dated Oct. 14, 2021, 7 pages.
Lambdares.com [online], "Stray light analysis and design of optical imaging systems," Jul. 2017, [retrieved on Apr. 1, 2019], retrieved from: URL<https://www.lambdares.com/wp-content/uploads/support/tracepro/tracepro_webinars/Stray%20Light%20Presentation%20July%202017.pdf>, 25 pages.
Office Action in Chinese Appln. No. 202080026345.8, dated Jul. 5, 2022, 25 pages (with English translation).
Office Action in Taiwan Appln. No. 110134233, dated Mar. 18, 2022, 6 pages (with English translation).
Optikos.com [online], "A complete optical measurement and testing system," Jan. 23, 2018, [retrieved on Apr. 1, 2019], retrieved from: URL<https://www.optikos.com/wp-content/uploads/2018/03/OpTest-Brochure_01.23.2018.pdf>, 20 pages.
PCT International Search Report and Written Opinion in International Appln. No. PCT/US2020/024940, dated Jul. 8, 2020, 10 pages.
TW Office Action in Taiwan Appln. No. 109111282, dated Dec. 11, 2020, 6 pages (with English translation).
Zhao et al., "Optimization design and performance test of optical antenna for laser communication," Proceedings of SPIE, Jan. 24, 2019, 10840:1084017-1084017.
Zong et al., "Characterization and correction of stray light in optical instruments," Proc of SPIE, Oct. 26, 2017, 6744:1-11.

* cited by examiner

STRAY-LIGHT TESTING STATION

CROSS-REFERENCE TO RELATED APPLICATIONS

This application is a continuation application of, and claims priority to, U.S. patent application Ser. No. 16/373,437, filed on Apr. 2, 2019. The disclosure of the foregoing application is incorporated herein by reference in its entirety for all purposes.

BACKGROUND

This specification relates to stray-light performance of cameras. Stray light generally refers to unwanted light in an optical system and typically negatively impacts the system performance. For example, in camera systems, stray light can reduce a signal-to-noise ratio in the system's sensor and/or can reduce contrast ratio. In many applications involving the use of optical systems to monitor outdoor environments, the sun is a significant source of stray light.

SUMMARY

This specification describes technologies relating to a stray-light testing station to characterize performance of a camera under stray-light conditions.

In general, one innovative aspect of the subject matter described in this specification can be embodied in a stray-light testing apparatus including an illumination assembly including a spatially extended light source and one or more optical elements arranged to direct a beam of light from the spatially extended light source along an optical path, where the illumination assembly includes a parabolic mirror arranged in the optical path, and where a diameter of the beam of light at the parabolic mirror is larger than a lateral dimension of the parabolic mirror. The stray-light testing apparatus also includes an optical receiver assembly including a lens receptacle configured to receive a lens module and position the lens module in the optical path downstream from the parabolic mirror so that the lens module focuses the beam of light from the spatially extended light source to an image plane. A moveable frame supports the optical receiver assembly, where the moveable frame includes one or more adjustable alignment stages, and where the adjustable alignment stages position the optical receiver assembly relative to the illumination assembly such that the optical path of the illumination assembly is within a field of view of the optical receiver assembly.

Other embodiments of this aspect include corresponding methods and computer programs, configured to perform the actions of the methods, encoded on computer storage devices.

These and other embodiments can each optionally include one or more of the following features. The parabolic mirror can be an off-axis parabolic mirror, where the off-axis parabolic mirror is off-axis by at least 30° degrees, at least 60° degrees, or at least 90° degrees. The sensor of the optical receiver assembly can be, for example, a complementary metal-oxide-semiconductor (CMOS) camera. In some implementations, the adjustable alignment stages can be adjusted in one or more dimensions to position the optical receiver assembly over a range of angles. The lens receptacle can be a compression fixture to hold the lens module in place. In some implementations, the one or more optical elements further includes one or more neutral density filters.

In some implementations, the optical receiver assembly includes an adjustable receptacle that is configured to receive a camera module and position the camera module in the optical path downstream from the parabolic mirror so that the light beam from the illumination assembly is focused to an image plane at the camera module.

In some implementations, the beam of light from the spatially extended light source is apodized, forming a uniform beam of light across a diameter. The spatially extended light source can be adjustable over a range of angles, and can have a 0.5° angular extent. The beam of light from the illumination assembly is allowed to reach the optical receiver assembly, e.g., during a stray light test of the optical receiver assembly.

In some implementations, the stray-light testing station further includes a control unit in data communication with the illumination assembly and the optical receiver assembly, and is operable to perform the operations of performing a stray-light test.

In general, another innovative aspect of the subject matter described in this specification can be embodied in methods for determining stray-light performance of an optical receiver assembly including aligning the optical receiver assembly in an optical path downstream from an illumination assembly including a parabolic mirror using one or more adjustable alignment stages, where aligning the optical receiver assembly includes focusing a beam of light from a spatially extended light source of the illumination assembly to an image plane of a sensor of the optical receiver assembly, selecting a first light intensity for the spatially extended light source from multiple different light intensities, exposing the optical receiver assembly to the light from the spatially extended light source at the first light intensity, capturing image data by the sensor of the optical receiver assembly while exposing the optical receiver assembly to the light at the first light intensity, and determining, based on the captured image data, performance metrics for the optical receiver assembly.

These and other embodiments can each optionally include one or more of the following features. In some implementations, determining stray-light performance of the optical receiver assembly further includes determining stray-light performance of the optical receiver assembly at multiple angles of incidence of the spatially extended light source within a field of view of the optical receiver assembly.

In some implementations, selecting the first light intensity of the multiple light intensities from the spatially extended light source includes attenuating the beam of light from the spatially extended light source using a neutral density filter.

Particular embodiments of the subject matter described in this specification can be implemented so as to realize one or more of the following advantages. An advantage of this technology is that it can be used to calibrate the stray-light performance of a camera assembly, including a lens and sensor(s) (e.g., a CMOS sensor). In particular, the performance of the camera assembly can be measured under stray-light conditions by illuminating the camera assembly with a spatially extended source at infinity, e.g., to mimic illumination conditions of the sun, high beams, or the like. The apparatus can be used to simulate conditions under which the camera is illuminated by various different light sources, for example, a high intensity light source like the sun, an infrared source, a hyper-spectral source, etc. Simulating the various stray-light illumination conditions can assist in developing, for example, a rejection ratio for the camera assembly to improve camera performance under exposure conditions including stray-light sources. A stray-light testing station can be adjustable to receive various lens types to accommodate rapid evaluation of lens of differing shapes, e.g., from different manufacturers.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Overview

The technology of this patent application is a stray-light testing station that is used to characterize performance of a camera under stray-light conditions. The technology utilizes a spatially extended light source imaged at infinity to measure stray-light effects on the camera and generate a rejection ratio for the camera.

More particularly, the technology incorporates a spatially extended light source to characterize stray-light performance of a camera, e.g., to simulate operation of the camera when the sun or another high-intensity light source falls within the camera's field of view. An angular extent of the spatially extended light source can be selected over a range, e.g., 0.1°-5° degrees. For example, the angular extent of the spatially extended light source can be selected to mimic when the sun is within the camera's field of view, for example, an angular extent of 0.5° degrees can be selected to mimic the angular extent of the sun when viewed from Earth.

The testing station includes a light source including a high-intensity lamp (e.g., a 6500 k source, an infrared 850 nm source, hyper-spectral source, etc.), an off-axis parabolic mirror, and two rotational stages to adjust an angle of incidence of the spatially extended light source at the camera. The light source is configured such that the beam emitted from the light source overfills the lens of the camera to ensure uniformity of the beam and reduce fringe effects. Additionally, the off-axis parabolic mirror can be arranged to accommodate a beam from the light source whose direction is highly non-parallel to the optical axis of the camera, where the parabolic mirror can be greater than 15° degrees off-axis, e.g., 30° or more, 60° or more, or such as 90° off-axis.

The rejection ratio can be determined using the stray-light testing station, by measuring the effect of the extended light source on the performance of the camera sensor, e.g., on a CMOS sensor, using various neutral density (ND) filters to attenuate the extended light source. The effect of the extended light source on the performance of the camera sensor can be classified by a measurement metric, for example, as a spread of the light from a center point of the light source. In some implementations, the spread of the light from the center point of the light source can be characterized as a radial spread of the light from the center point of the light source.

Stray-Light Testing Station

Figure 1:
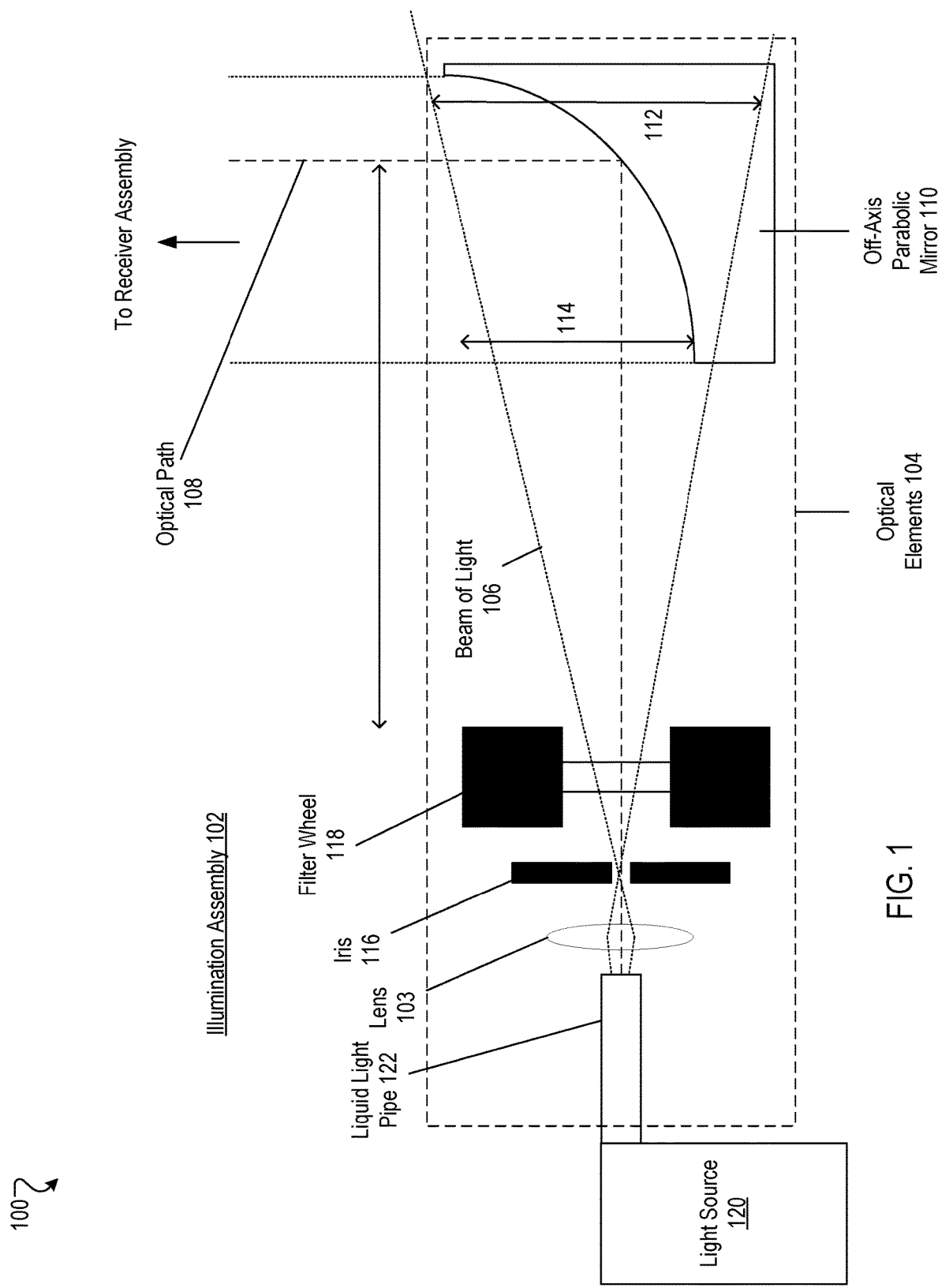
FIG. 1 is a block diagram of an example of an illumination assembly for a stray-light testing station.

FIG. 1 is a block diagram 100 of an example of an illumination assembly 102 for a stray-light testing station. Illumination assembly 102 includes optical elements 104 which shape and/or filter light from the light source to present a spatially-extended light source at infinity to an optical system under test. Optical elements 104 include a liquid light pipe 122 to receive light from a light source 120, and direct a beam of light 106 from the light source to a receiver assembly that includes the optical system under test along an optical path 108.

Optical elements 104 additionally include a focusing optic 103 (e.g., a lens) which focuses light emitted from light pipe 122 to an aperture provided by an iris 116. Beam 106 diverges from iris 116 before being collimated by a parabolic mirror 110, which also reflects the beam towards the receiver assembly. Parabolic mirror 110 is positioned in the diverging beam at a point where a diameter 112 of the beam of light 106 at the parabolic mirror 110 is larger than a lateral dimension 114 of the parabolic mirror 110. As such, beam 106 over-fills the parabolic mirror 110, which serves to apodize the beam by directing only the central part of the beam towards the receiver assembly. The result is that illumination assembly 102 delivers a collimated beam of substantially uniform intensity across its entire diameter to the receiver assembly, presenting to the receiver assembly a spatially-extended light source at infinity from the perspective of an imaging system of the receiver assembly. For example, where the diameter of the beam exiting the illumination assembly can range from about 1 mm to about 100 mm (e.g., from about 1 mm to about 50 mm, from about 1 mm to about 20 mm, from about 1 mm to about 10 mm, from about 1 mm to about 5 mm). In some examples, the beam diameter is 38.1 mm (1.5 inches). The intensity of the beam exiting illumination assembly 102 can vary by less than 50% across its diameter (e.g., by 30% or less, by 20% or less, by 10% or less, by 5% or less).

Parabolic mirror can have a range of focal lengths, where the focal length can depend in part on an angle of incident light from the light source and optical elements 104 as well as a distance between the optical elements 104 and the parabolic mirror 110. The focal length of the parabolic mirror 110 is selected such that a fan of light from the light source and optical elements 104 overfills an aperture of the parabolic mirror. The focal length of the parabolic mirror 110 can range, for example, from 3-15 inches. In one example, a beam diameter is 1.5 inches and a focal length of the parabolic mirror is 6 inches. In another example, a beam diameter is 3 inches and a focal length of the parabolic mirror is 12 inches.

Parabolic mirror 110 can be an off-axis parabolic (OAP) mirror. For example, the symmetry axis of the parabola corresponding to the mirror's surface shape is not coaxial with a central ray that passes through the mirror's focal point on the symmetry axis. The degree to which an OAP mirror is displaced from the symmetry axis can be characterized by the angle subtended by the central ray before and after reflection from the mirror. The OAP mirror 110 can be off-axis by 15° or more, for example, 30° or more, 60° or more, such as 90° off-axis. Furthermore, iris 116 can be positioned at the focal point of OAP mirror 110.

In general, the materials of the respective optical elements 104 are selected in part based on a range of wavelengths of light that are being tested using the stray-light testing station. For example, optical elements 104 can be selected for optimal performance for a broadband of 450 nm-20 µm, 350 nm-750 nm visible wavelengths, and/or 650 nm-1050 nm for near-infrared wavelengths.

Optical elements 104 additionally include filter(s) 118 between iris 116 and mirror 110. In some implementations, iris 116 is a fixed iris to set a spot size of beam 106 exiting from a light source 120 via a light guide, e.g., liquid light pipe 122. In one example, iris 116 has a diameter determined by $$d=2f \tan 0.25^{*} d=2f \tan 0.25^{*} \quad (1)$$

where d is the diameter of the iris and f is the focal length of the parabolic mirror 110. The diameter d of the iris can range, for example, from 1 mm-10 mm. In some implementations, the diameter of the iris is adjustable such that the diameter d of the iris can be adjusted during a stray-light testing process.

Filter 118 is an optical filter to alter the transmitted light. Filter 118 can be, for example, a neutral density (ND) filter, a band-pass filter, an interference filter, a dichroic filter, an absorptive filter, etc. In some implementations, multiple filters 118 are included in an adjustable filter wheel, where a particular filter 118 of multiple filters 118 can be positioned within a path of the beam 106. In one example, multiple ND filters 118, e.g., ND filters having respective optical density (OD) of 0, 1, 2, 3, 4, 5, and 6, can be selected such that beam 106 can be adjusted to have variable intensity over a range of light output intensity.

In general, light source 120 is selected to provide light having a spectral composition and intensity suitable simulating stray light source for the optical system under test. Broadband, narrowband, or monochromatic sources are possible. In some embodiments, light source 120 can be, for example, a light-emitting diode (LED) broad spectrum source (e.g., having a color temperature of 6500K or warmer, e.g., 2700K-3000K, 3500K-4100K, or 5000K-6500K), a xenon bulb, an infrared 850 nm source, a hyperspectral source, or the like.

Other variations are also possible. For example, while a liquid light pipe 122 directs beam 106 from the light source 120 to optical elements 104, other light guides can be used. For example, in some implementations, the beam of light 106 can be directed from the light source 120 via an optical fiber bundle. The liquid light pipe 122 can be positioned with respect to optical elements 104 such that a cone of light from beam of light 106 overfills the parabolic mirror 110. In certain implementations, free space optics are used to direct light from the light source to optical elements 104. In certain implementations, the light source 120 is positioned adjacent to optical elements 104 such that beam 106 from the light source 120 is directed to the optical elements 104.

In some implementations, multiple light sources 120 can be included in the illumination assembly 102, where one or more liquid light pipes 122 can be positioned to guide light from a respective light source 120 of the multiple light sources 120 to optical elements 104. For example, an illumination assembly 102 can include a 6500 k LED light source and an infrared 850 nm light source, where each light source has a respective liquid light pipe 122 that can be interchangeable to direct a selected light source 120 into the optical elements along optical path 108. A light source 120 can be hyperspectral light source, e.g., a multi-LED light source including a range of wavelengths, for characterizing performance of a camera module and/or lens module over a range of wavelengths, e.g., near-infrared through ultraviolet wavelengths.

Illumination assembly 102 can provide a spatially extended light source at infinity with a beam width ranging from 25 mm to 100 mm in diameter along optical path 108. The spatially extended source at infinity can be guided using the optical elements 104 to direct a beam 106 along optical path 108 to an optical receiver assembly for the stray-light testing station, as described below with reference to FIG. 2.

Figure 2:
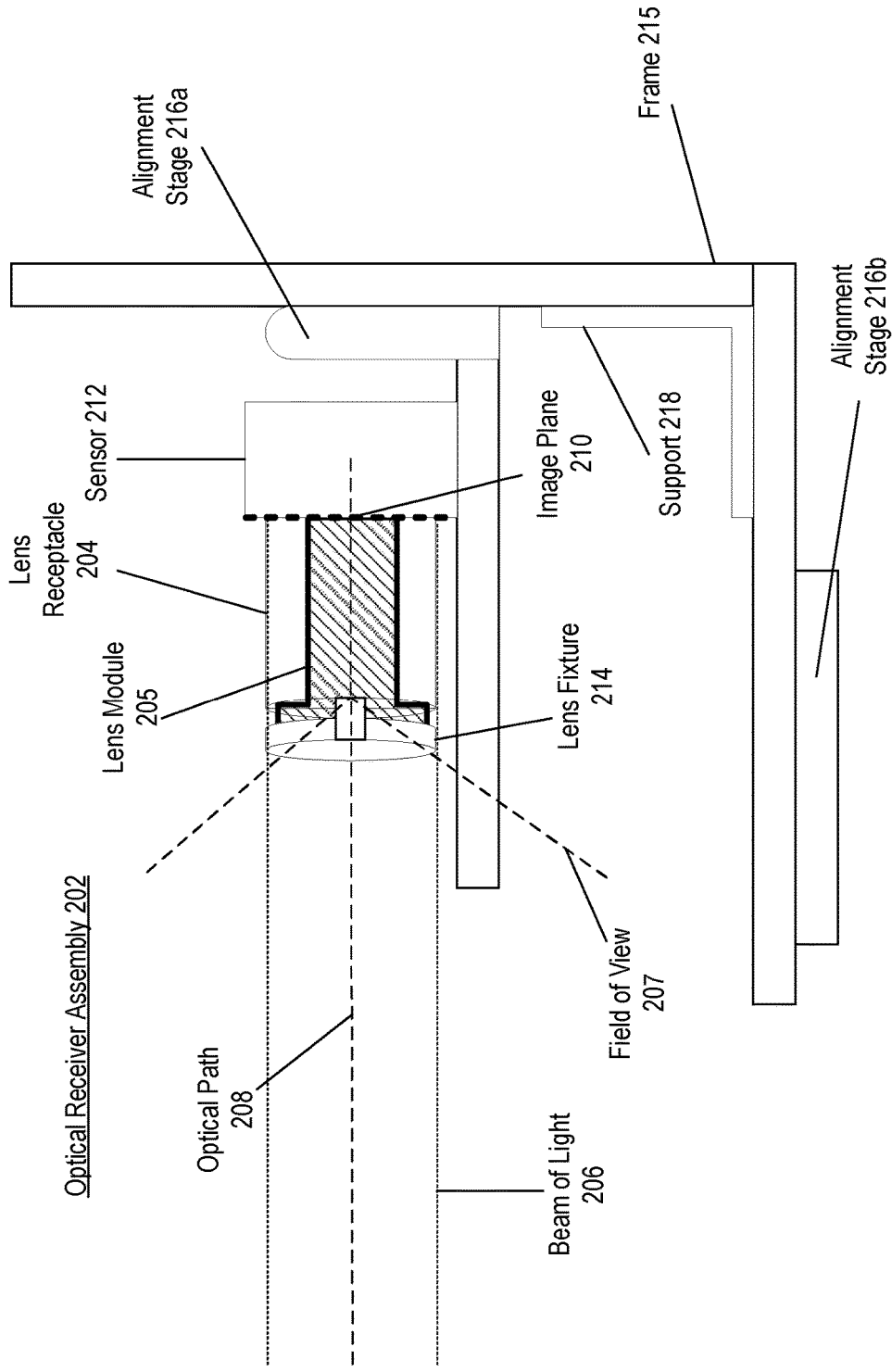
FIG. 2 is a block diagram of an example of a receiving assembly for the stray-light testing station.

FIG. 2 is a block diagram 200 of an example of an optical receiver assembly 202 for the stray-light testing station. The optical receiver assembly 202 includes a lens receptacle 204 that can be adapted to receive a lens module 205 and position the lens module 205 so that the lens module focuses a beam of light 206 along optical path 208 to an image plane 210. The image plane 210 can correspond to a sensor 212, where the sensor 212 captures a two-dimensional (2D) image of the beam of light 206 that is focused on the image plane 210. Sensor 212 can be, for example, a complementary metal oxide semiconductor (CMOS) sensor, a charge-coupled device (CCD) sensor, a photomultiplier tube, or a photodiode.

The optical receiver assembly 202 can utilized the natural divergence of the beam of light 206 from the illumination assembly, rather than using optical components to shape the beam of light 206 upstream from the parabolic mirror of the illumination assembly. An amount of angular beam divergence for the beam of light 206 at the optical receiver assembly 202 depends in part on an angular extent of the extended source, e.g., ±0.25° degrees, where a range of angular beam divergence depends on the focal length f and iris diameter d as determined by Equation (1).

Optical receiver assembly 202 includes a lens fixture 214 that retains the lens module 205 when the lens module 205 is received by the lens receptacle 204. Lens receptacle 204 includes multiple dimensions, e.g., a length and an internal diameter, that are selected, in part, based on dimensions of the lens module 205 that is being tested using the stray-light testing station. Further details of the lens receptacle 204 are discussed with reference to FIG. 6 below.

Lens fixture 214 can be a compression fixture to hold the lens module 205 in place and allow for easy insertion and removal of the lens module 205 in the optical receiver assembly 202. Lens fixture 214 includes multiple dimensions, e.g., an internal diameter of a window, a length of a compression screw, that are selected, in part, based on dimensions of the lens module 205 that is being tested using the stray-light testing station. Further details of the lens fixture 214 are described with reference to FIG. 5.

Though depicted with reference to FIG. 2 as separate components of a lens receptacle 204 to receive a lens module 205 and a sensor 212, the optical receiver assembly 202 can alternatively include an adjustable receptacle that receives a camera module and position the camera module in the beam of light 206 along optical path 208 so that the light beam 206 is focused to an image plane at the camera module. A camera module can include an assembled lens and sensor device, where the lens of the camera module is attached to the sensor to focus a beam of light 206 onto the imaging plane of the sensor in the camera module.

Materials of the elements included in the optical receiver assembly, e.g., the lens receptacle 204 and lens fixture 214, can be selected, in part, based on an ease of fabrication, a compatibility with the materials of the lens module 205, and/or to reduce stray light effects. Materials can include metals, e.g., aluminum or steel, and plastic, e.g., acetal material. The elements included in the optical receiver assembly can be coated with a paint or similar substance, e.g., a matte black paint layer, or have a black-anodized surface, e.g., black-anodized aluminum, to reduce stray light effects.

Optical receiver assembly 202 includes a moveable frame 215 supporting the optical receiver assembly 202 in the stray-light testing station. The moveable frame 215 includes one or more adjustable alignment stages 216a, 216b. The adjustable alignment stages 216a, 216b can be attached to each other by a support 218, e.g., an L-bracket, an angle bracket, or the like.

The adjustable alignment stages 216a, 216b position the optical receiver assembly 202 relative to a beam of light 206 along optical path 208 from the illumination assembly, e.g., illumination assembly 102 from FIG. 1. The optical receiver assembly 202 is positioned using the adjustable alignment stages 216a, 216b such that the optical path 208 is within the field of view of the optical receiver assembly 202. The adjustable alignment stages 216a, 216b can be, for example, rotational alignment stages, tip/tilt alignment stages, translational XYZ stages, or another similar stage that provides multiple degrees of freedom of movement to position the optical receiver assembly 202 relative to optical path 208. The adjustable alignment stages 216a and 216b can be adjusted independently of each other, and can provide yaw and roll to change the angle of incidence of the optical path 208 to the lens module 205.

In some implementations, the moveable frame 215 supporting the optical receiver assembly 202 can be adjusted over a range of angles of incidence, e.g., by adjusting the position of the optical receiver assembly with respect to the optical path 208 within the field of view 207 of the lens module 205. The range of angles of incidence can be, for example, ±90° degrees with respect to a vertical axis and/or a horizontal axis of the lens module 205. The range of angles of incidence can be defined by a field of view of the lens module 205. A particular range of angles of incidence can depend in part on a field of view of lens module 205. For example, lens module 205 can be a wide-angle lens module such that performance of the lens module 205 and sensor 212 under stray-light conditions requires testing over a range of incident angles, e.g., where a field of view of the wide-angle lens module is 180° degrees. In some implementations, the moveable frame 215 including the adjustable alignment stages 216a, 216b are motorized alignment stages which can be positioned by a control unit that operates the motorized alignment stages. The motorized alignment stages can include various motors, for example, piezoelectric motors, servo-motors, linear motors, stepper motors, or the like.

Figure 3:
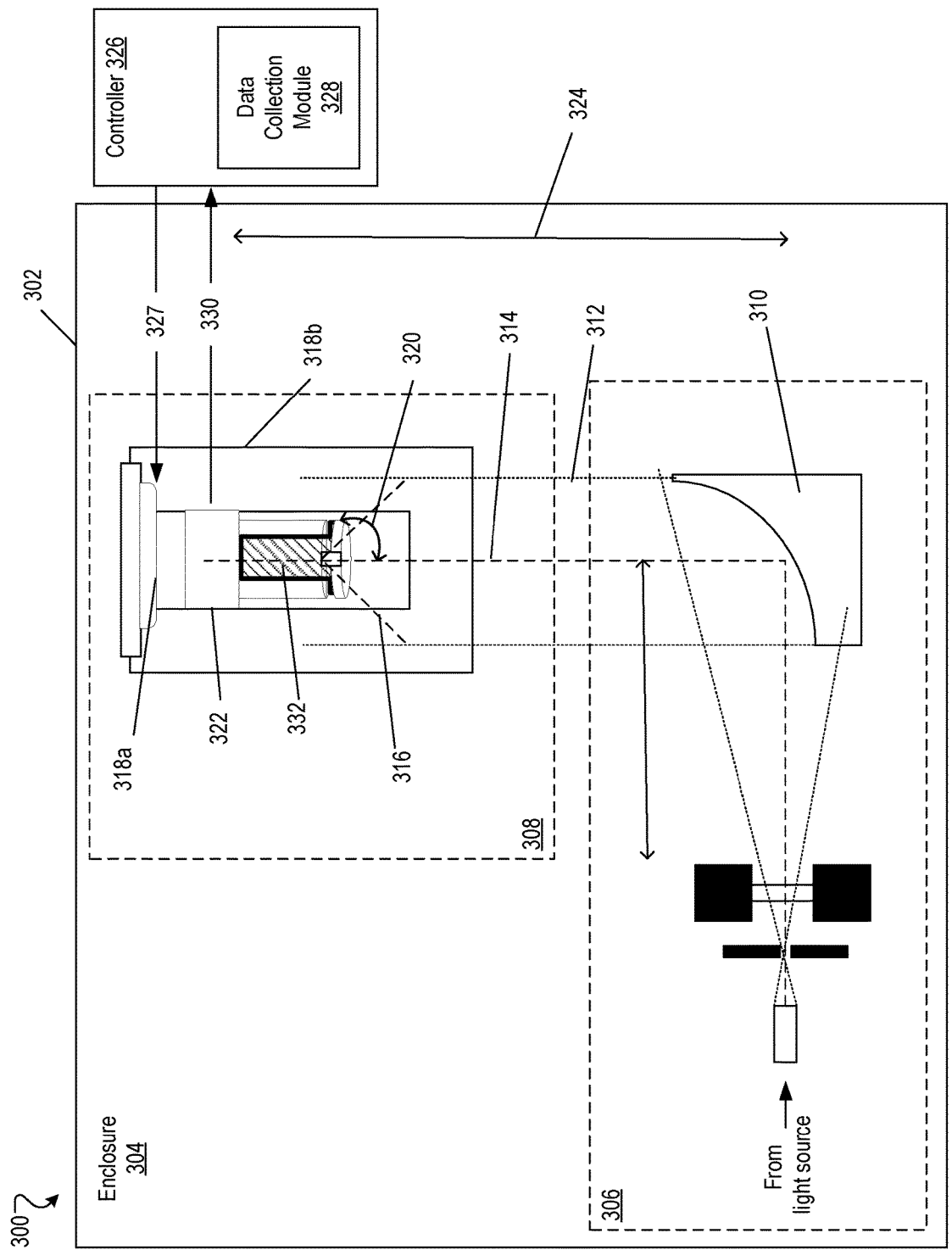
FIG. 3 is a block diagram of an example of the stray-light testing station.

FIG. 3 is a block diagram 300 of an example of the stray-light testing station 302. An enclosure 304 encompasses the illumination assembly 306, e.g., illumination assembly 102 described in FIG. 1, and the optical receiver assembly 308, e.g., optical receiver assembly 202 described in FIG. 2. The enclosure 304 can be made of metal, e.g., aluminum, steel, etc., or plastic materials and can be coated with a non-reflective or low-reflectivity layer, e.g., matte black paint. Enclosure 304 can completely enclose the stray-light testing station 302, to reduce exposure from ambient light below a threshold, e.g., reduce ambient light below 90%.

As depicted in FIG. 3, the illumination assembly 306 and optical receiver assembly 308 are arranged at a 90° degree angle with respect to each other, where OAP mirror 310 of the illumination assembly 306 is a 90° off-axis. The illumination assembly 306 and optical receiver assembly 308 can alternatively be positioned at a different angle with respect to each other, for example, at an angle greater than 15° degrees by utilizing an OAP mirror 310 having a different off-axis angle, e.g., 15° degrees or more off-axis.

Beam of light 312 is directed, by the OAP mirror 310 along optical path 314 from the illumination assembly 306 into a field of view 316 of the optical receiver assembly 308. Adjustable alignment stages 318a, 318b can be utilized to adjust an angle of incidence 320 of the optical path 314 with respect to the optical receiver assembly 308, e.g., to adjust an angle of incidence 320 of the spatially extended light source on the lens module or camera module of the optical receiver assembly 308.

The sensor 322 of the optical receiver assembly 308, e.g., sensor 212 of optical receiver assembly 202 described in FIG. 2, can be positioned along the optical path 314 at a distance 324 from the parabolic mirror 310 such that a radial angular extent of the parabolic mirror 310 of the illumination assembly 306 is within a stray light bloom of $10^{-4}$ and $10^{-5}$. Distance 324 scales with the diameter of the parabolic mirror 310, for example, distance 324 can range between 0.5 meters to 3 meters. In one example, the angular extent of the parabolic mirror 310 is selected to achieve a stray light bloom of $10^{-4}$ and $10^{-5}$ is less than 1.5° degrees. In one example, the sensor 322 is positioned at a distance 324 of 900 mm from the parabolic mirror 310 such that the angular extent of the parabolic mirror 310 is 1.2° degrees.

The spatially extended source at infinity provided by the illumination assembly 306 can have an angular extent ranging from 0.1° to 5° degrees, depending in part on a distance 324 between the parabolic mirror 310 and the optical receiver assembly 308. In one example, a distance 324 between the parabolic mirror 310 and the optical receiver assembly 308 such that the spatially extended source at infinity has an angular extent of 0.5° degrees.

In some implementations, distance 324 can be adjusted by the adjustable alignment stages 318a, 318b. In one example, the optical receiver assembly 308 can be further away or closer to the parabolic mirror 310 by a translational movement of alignment stage 318b.

Stray-light testing station 302 includes a controller 326 which operates light source of the illumination assembly 306, for example, can control an intensity of the light source, turn the light source on/off, and the like. Controller 326 can additionally control automated functionality of the stray-light testing station 302 including, for example, an automated filter wheel to select a filter (e.g., filter 118) and/or adjust an alignment of the optical receiver assembly 308 by operating the motorized adjustable alignment stages 318a, 318b.

In some implementations, controller 326 includes a data collection module 328. Data collection module 328 can be in data communication with the sensor 322 or a camera module of the optical receiver assembly to receive imaging data 330 from the sensor 322 of the optical receiver module 308. For example, imaging data 330 can be two-dimensional images of the beam of light 312 as collected by the sensor 322 at the imaging plane of the sensor 322. Controller 326 and data collection module 328 can be sub-components of a computer, mobile device (e.g., mobile phone, tablet, or the like), or the like that can provide control instructions 327 and record details related to the stray-light testing system 302.

In some implementations, controller 326 includes a stray-light testing application to receive collected imaging data from the data collection module 328 and determine performance metrics for the lens module 332, e.g., lens module 205, sensor 322, or a camera module of the optical receiver assembly 308. Determining performance metrics is discussed in further details below with reference to FIG. 7.

Figure 4:
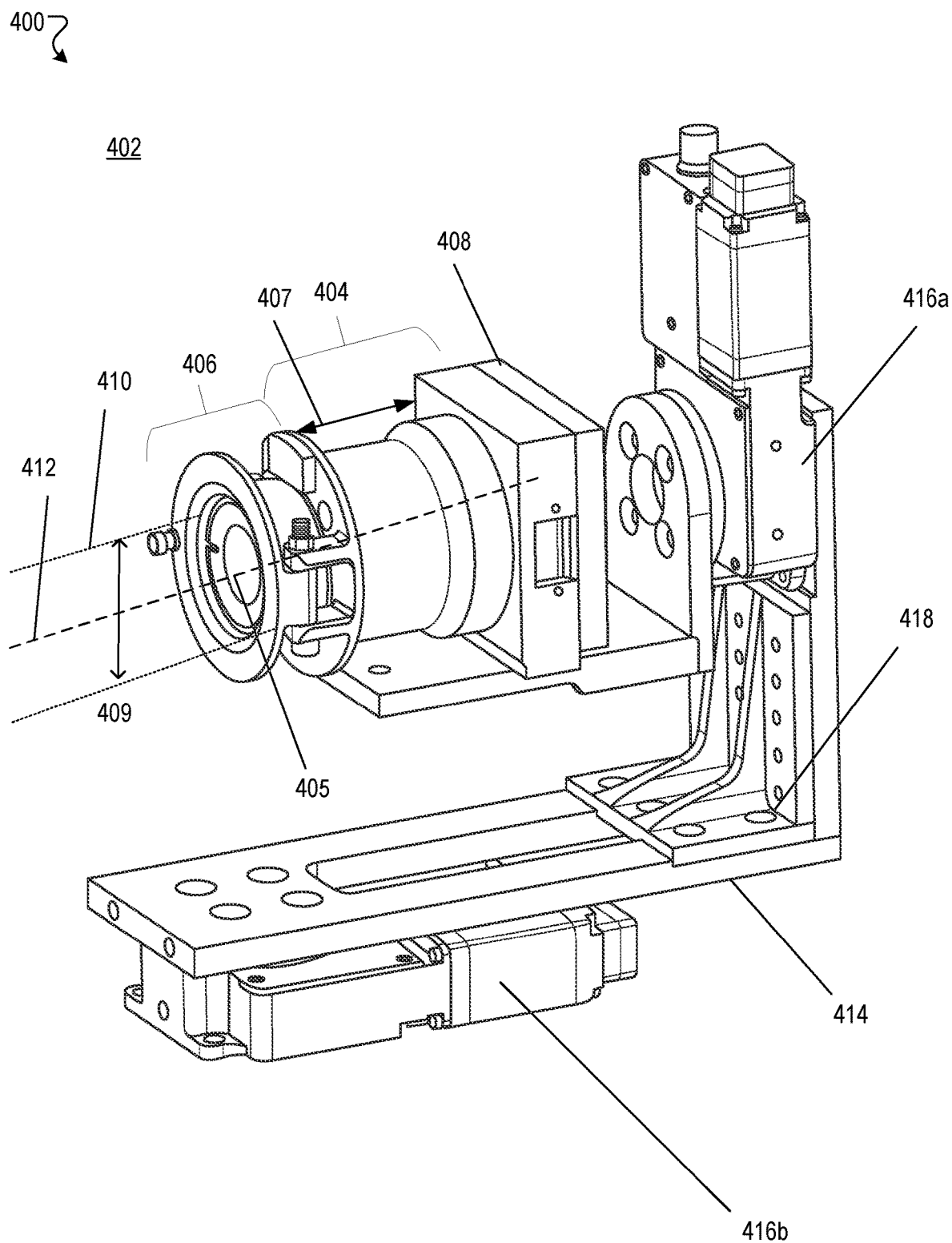
FIG. 4 is a schematic of an example of the optical receiver assembly for the stray-light testing station.

FIG. 4 is a schematic 400 of an example of the optical receiver assembly 402 for the stray-light testing station. As described above with reference to optical receiver assembly 202 depicted in FIG. 2, the optical receiver assembly 402 includes a lens receptacle 404 to receive a lens module 405 that is held in place by a lens fixture 406. Dimensions of the lens receptacle 404, e.g., a length 407, selected to position the lens module 405 a distance from the sensor 408 such that a beam of light 410 along optical path 412 from the illumination assembly is focused at an image plane of the sensor 408.

Optical receiver assembly 402 additionally includes a moveable frame 414 including adjustable alignment stages 416a and 416b that are attached by a support 418. The adjustable alignment stages 416a and 416b can be of a same type of alignment stage, e.g., both are rotational stages, or each of a different type of alignment stage, e.g., where 416a is a rotational stage and 416b is a translational XYZ stage. In one example, alignment stages 416a and 416b are rotational stages that control a yaw and roll of the optical receiver assembly 402 and control an angle of incidence of the beam of light 410 at the lens module 405.

Though frame 414 is depicted in FIG. 4 as having two adjustable alignment stages 416a and 416b, the frame 414 can include more or fewer adjustable alignment stages, e.g., one alignment stage or three alignment stages, to adjust a position of the optical receiver assembly 402 relative to optical path 412 and the illumination assembly.

Figure 5:
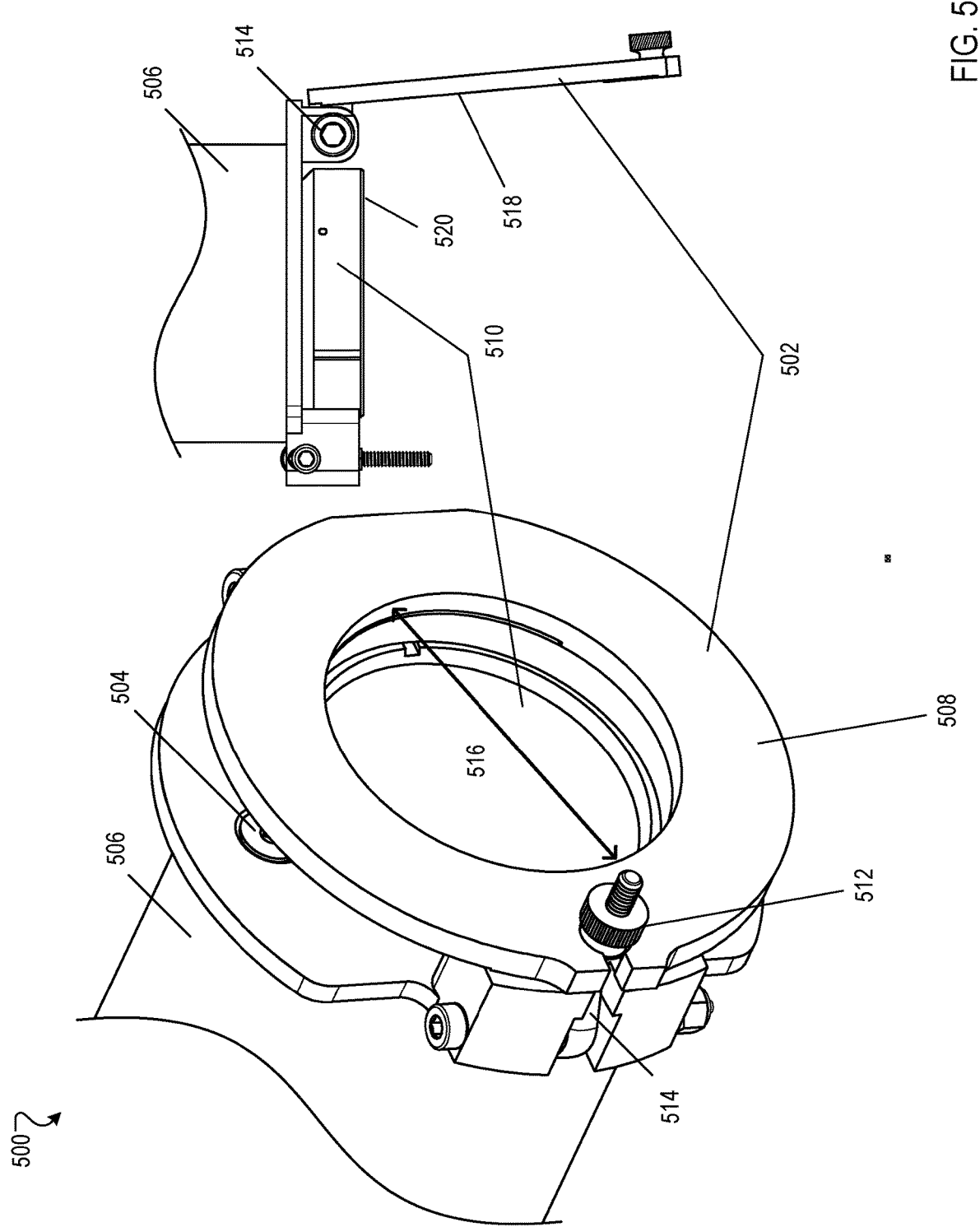
FIG. 5 is a schematic of an example of a lens fixture for the optical receiver assembly.

FIG. 5 is a schematic of an example 500 of a lens fixture 502 for the optical receiver assembly, e.g., optical receiver assembly 202 and optical receiver assembly 402. Lens fixture 502 includes attachment points 504 to lens receptacle 506. Lens fixture 502 includes a lens cap 508 that is compressed against a lens module 510 by a compression screw 512 to hold the lens module 510 secure within the lens receptacle 506. Lens cap 508 can be fabricated, e.g., milled, from acetal material or another plastic to reduce damage on the lens module 510 and have improved wear properties over repeated use. Compression screw 512 can be selected to prevent over-tightening of the lens cap 508 over the lens module 510, to reduce chromatic aberration of the lens module 510 due to distortion of the lens module 510. Compression screw 512 can include, for example, a low torque stainless steel M3 threaded rod end, or another similar material and thread count and a compatible nut for tightening the lens cap 508 over the lens module 510.

Lens cap 508 is attached to a hinge 514, where the lens cap 508 can pivot on hinge 514 from an open position, e.g., to receive a lens module 510, to a closed position, e.g., to secure the lens module 510 in place. In one example, hinge 514 allows to lens cap 508 to pivot by 90° degrees or more with respect to a surface of the installed lens module 510 in lens receptacle 506. An inner diameter 516 of the lens cap 508 can be selected, in part, to be larger than the outer diameter of the input aperture of the lens module 510 and can range in inner diameter 516, 409, for example between 5 mm to 100 mm in diameter. An inner surface 518 of lens cap 508 is depicted in FIG. 5 as a flat disk that lies flush with an outer surface 520 of lens module 510. In some implementations, lens cap 508 may include a counterbore or another surface feature, e.g., a padded feature, to accommodate a position of the lens module 510.

In some implementations, lens fixture 502 includes one or more adjustment points to move the lens module 510 along the optical axis of the lens module relative to a position of a sensor, e.g., sensor 408. The one or more adjustment points of the lens fixture 502 can be used to align a back-focal length of the lens module 510 with a sensor position.

Figure 6:
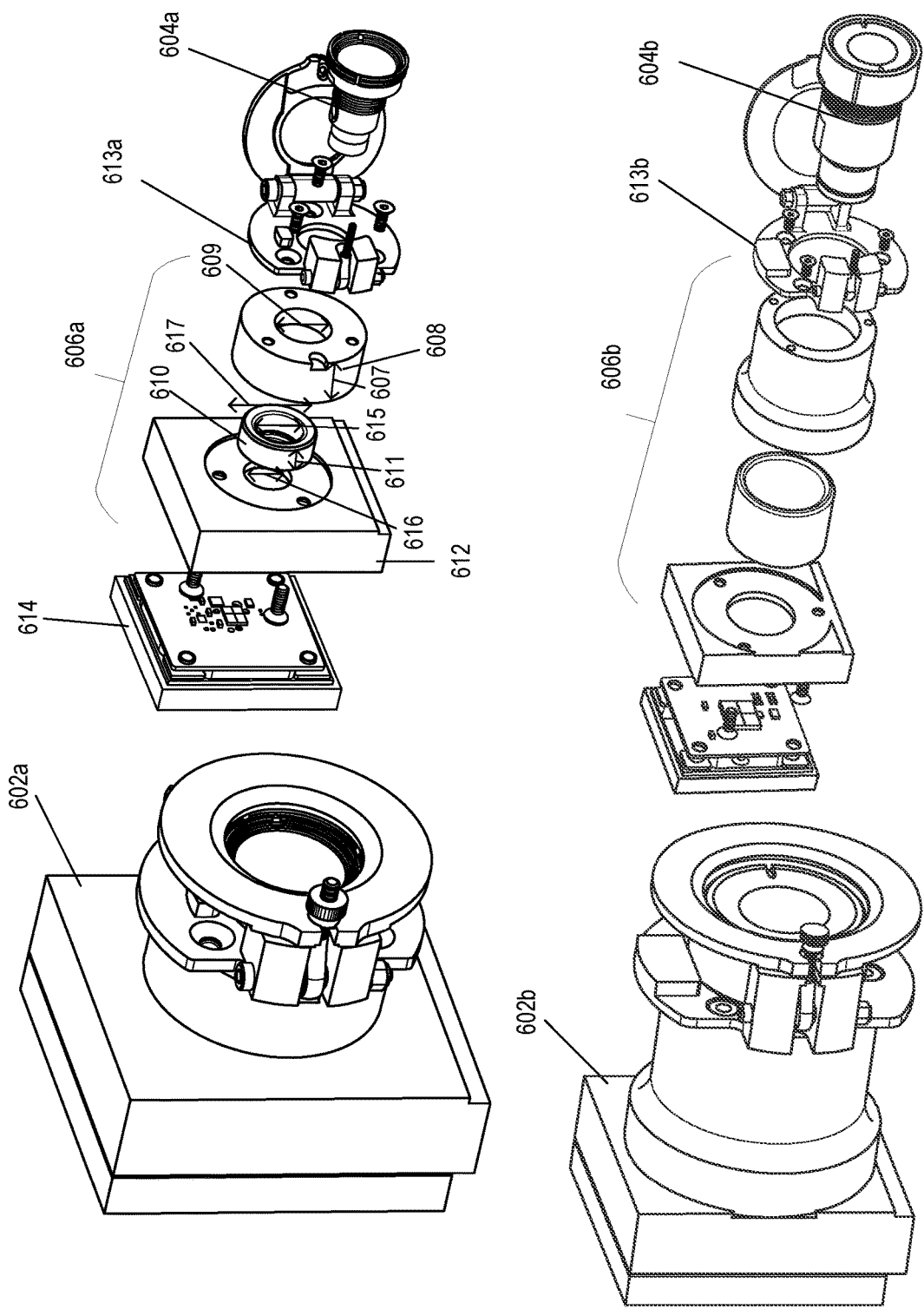
FIG. 6 are schematics of examples of optical receiver assemblies.

FIG. 6 are schematics of examples of optical receiver assemblies 602a, 602b, where each optical receiver assembly 602a, 602b is configured to receive a respective lens module 604a and 604b. Lens modules 604a, 604b can each have different operating and physical characteristics, e.g., focal lengths, physical dimensions, fields of view, etc. Physical dimensions of the lens modules can include a barrel length of the lens module, multiple diameters of the lens module across the barrel length of the lens module, different threading or other attachment mechanisms. Lens module diameters can vary, for example, between 14.9 mm and 50 mm. Overall lengths of the lens modules can vary, for example, between 48 mm and 91.5 mm. A field of view of the lens module can vary, for example, ±90° degrees to define a hemisphere field of view.

In some implementations, lens modules can have diameters smaller than 14.9 mm or larger than 50 mm as well as lengths that are smaller than 48 mm or larger than 91.5 mm. The stray light testing station can be adjustable to receive lens modules of varying sizes and varying focal lengths, e.g., by adjusting a fixed position of sensor (e.g., sensor 212) on the alignment stage (e.g., alignment stage 216a).

The differing operating and physical characteristics of each lens module 604a, 604b can require different lens receptacles 606a and 606b, respectively, such that each lens module 604a and 604b can be accommodated by the respective lens receptacles into the optical receiver assembly. Lens receptacles 606a and 606b can each include multiple components, e.g., barrel 608, bushing 610, and printed circuit board (PCB) mount 612. Optical receiver assembly 602a, 602b additionally includes lens fixture 613, e.g., lens fixture 502 described in FIG. 5. Each of the multiple components of the lens receptacle 606a, 606b and lens fixtures 613a, 613b can be selected to accommodate the operating and physical characteristics of the respective lens module 604a, 604b being mounted into the optical receiver assembly 602a, 602b.

For clarity of discussion, particulars of the optical receiver assembly 602a including the components of lens receptacle 606a and lens fixture 613a are discussed in more detail here, where the details provided can be applied to lens receptacle 606b and lens fixture 613b and, more generally, to a given optical receiver assembly including a lens receptacle and lens fixture for a given lens module being mounted into the optical receiver assembly.

Barrel 608 and bushing 610 are selected for inclusion in the optical receiver assembly 602a based in part on the particular physical and operating characteristics of lens module 604a. Dimensions of the barrel 608, bushing 610, and PCB mount 612, including length 607, 611, inner and outer diameters 609, 615, 617, and mounting attachments, can be selected to position the lens module 604a with respect to the optical receiver assembly 602a such that the imaging plane of the lens module 604a overlaps with a sensor 614 when the lens module 604a is mounted in the optical receiver assembly 602a.

Dimensions of the barrel 608 and bushing 610 are selected such that the bushing 610 slip fits into the barrel 608 and where a portion of the lens module 604a is received by the bushing 610 and is secured by the bushing 610 when the lens module is mounted in the optical receiver assembly 602a. Dimensions of the barrel 608, for example, a barrel length 607 can be selected based on the overall length of the lens module 604a that is being mounted. For example, for a lens module 604a having an overall length, for example, between 48 mm and 91.5 mm, the barrel length 607 of barrel 608 can be 48 mm to 91.5 mm. Dimensions of the inner diameter 615 of the bushing 610 can be selected based on an outer diameter of the lens module. For example, for a lens module 604a having an outer diameter between 14.9 mm and 50 mm over a section of the lens module where the bushing 610 will be secured, the bushing 610 will have an inner diameter 615 between 14.9 mm and 50 mm.

Dimensions of the PCB mount 612 can depend, in part, on physical and operating characteristics of the lens module 604a, as well as, the characteristics of the sensor 614. For example, an inner diameter 616 of the PCB mount 612 is selected to accommodate an outer diameter of lens module 604a that passes through the inner diameter of the PCB mount 612. The PCB mount 612 can be selected based in part on dimensions of the sensor component, e.g., height, width, and length of the sensor component on sensor 614, as well as the dimensions of the sensor mount of sensor 614. PCB mount 612 can include tapped holes, e.g., two M6 tapped holes, along a bottom surface of the PCB mount 612 which are used to mount the assembled optical receiver assembly 602a to a frame, e.g., frame 414 as described in FIG. 4 above.

The lens receptacle 606a including barrel 608, bushing 610 and PCB mount 612 can be assembled using tapped or through-hole mounting between respective elements of the lens receptacle 606a and/or adhesives, e.g., cyanoacrylate or other similar adhesive. For example, bushing 610 can be slip fit inside the barrel 608 and adhered using a few drops of cyanoacrylate adhesive. Lens fixture 613a can be mounted to the lens receptacle 606a by screws, e.g., M4 screws, inserted from the lens fixture 613a into corresponding tapped holes on the barrel 608. Barrel 608 can be mounted to the PCB mount 612 by screws, e.g., M5 screws, inserted from the PCB mount 612 into corresponding tapped holes on the barrel 608.

Sensor 614 can also be selected to be compatible with a particular lens module 604a. Sensor 614 can be selected, for example, to include a number of pixels, a size/density of pixels, a sensitivity range, a wavelength range, and the like. Sensor 614 is mounted to the PCB mount 612, e.g., using through holes on the sensor 614 into tapped holes of the PCB mount, such that the sensor 614 is aligned with the imaging plane of the lens module 604a.

The components of optical receiver assemblies 602a, 602b are selected in general to create a light-tight system such that light entering the optical receiver assembly 602a, 602b is limited to light from an illumination assembly, e.g., illumination assembly 306.

In some implementations, varying materials, thicknesses, and transmission/reflection properties of a protective glass cover for the lens modules can generate stray-light effects for the lens module, which can be measured using the stray light testing station described herein.

Example Process for Stray-Light Testing

Figure 7:
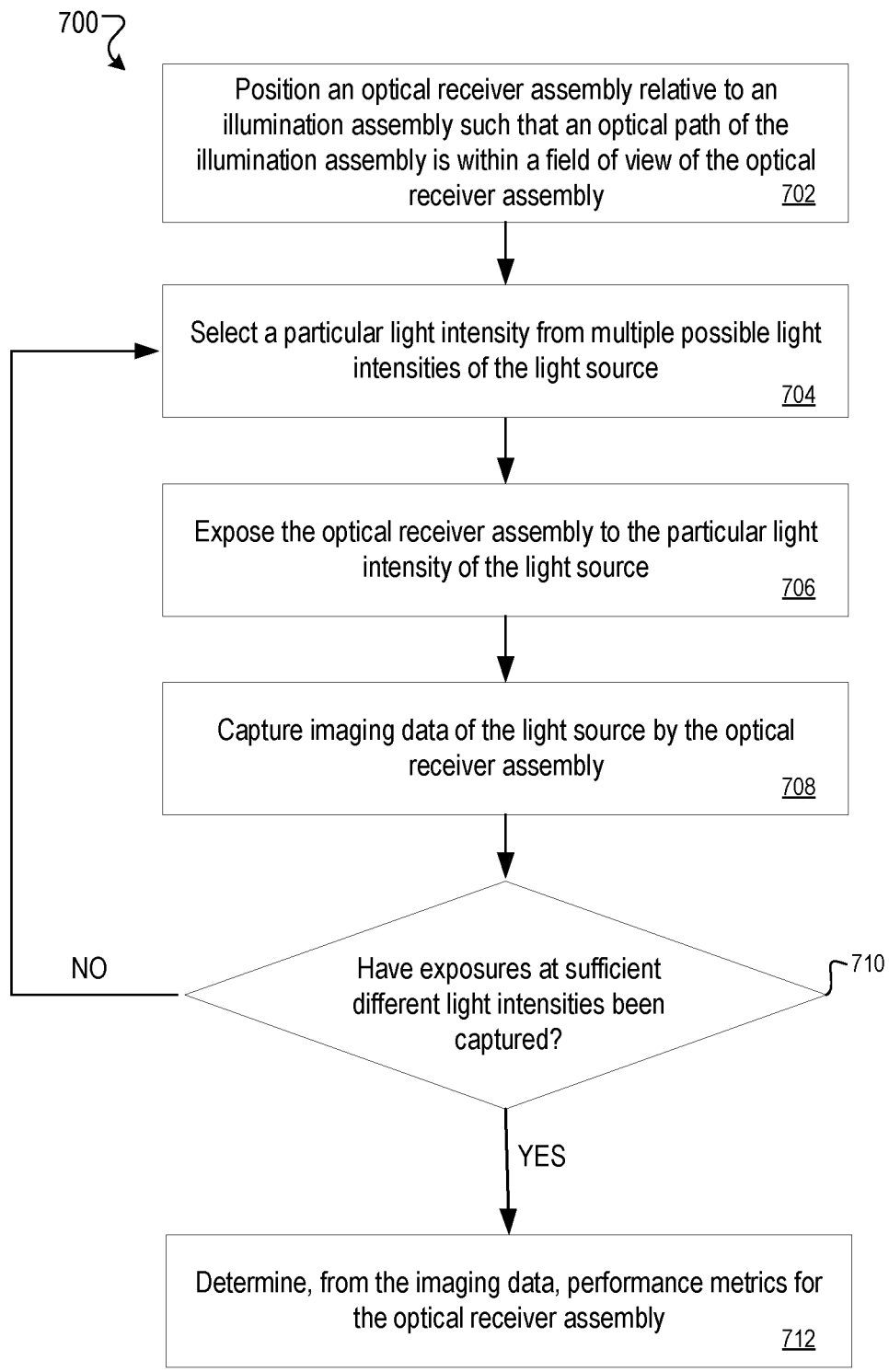
FIG. 7 is a flow diagram of an example process for performing a stray-light test using the stray-light testing station.

FIG. 7 is a flow diagram of an example process 700 for utilizing the stray-light testing station to characterize performance of a lens module under stray-light conditions.

An optical receiver assembly is positioned relative to an illumination assembly such that an optical path of the illumination assembly is within a field of view of the optical receiver assembly (702). As described with reference to FIG. 3 above, the optical receiver assembly 308 is aligned with the optical path 314 of the beam of light 312, e.g., the spatially extended light source, from the illumination assembly 306 in the stray-light testing station 302. The alignment can be performed using the one or more adjustable alignment stages 318a, 318b to position the field of view 316 of the lens module 332 within the optical path 314 and such that the lens module 332 forms an image plane on the sensor 322.

Enclosure 304 can be arranged surrounding the stray-light testing station 302 such that the ambient light exposure to the sensor 322 is reduced by a threshold amount, e.g., by 90% or more. A baseline or dark measurement can be taken prior to beginning a testing process to use as reference, for example, to establish a baseline signal-to-noise ratio for the sensor 322.

A particular light intensity from multiple possible light intensities of the light source, e.g., the spatially extended light source 312, is selected (704). The particular light intensity can be selected, for example, using a ND filter, or another form of beam intensity attenuation. In one example, the light intensity can be attenuated using a ND filter having an optical density value of 4.0. In another example, the light intensity can be attenuated using a ND filter having an optical density values of 1.0. In yet another example, the light intensity can be attenuated by adjusting the light source power by 5% or more, 50% or more, or 75% or more, or the like.

The optical receiver assembly is exposed to the particular light intensity of the spatially extended light source (706). The optical receiver assembly 308 can be exposed to spatially extended light source 312 by turning on the light source (e.g., light source 120). In some implementations, the spatially extended light source from the illumination assembly 306 can be exposed to the optical receiver assembly 308 by opening a shutter, e.g., opening iris 116, removing a beam block, e.g., as part of the filter wheel 118, or another deflection of the beam 312.

Imaging data of the spatially extended light source is captured by the optical receiver assembly while the optical receiver assembly is exposed to the particular intensity of the light source (708). Light exposure incident on the sensor 322 of the optical receiver assembly 308 can be, for example, for a few seconds. Imaging data 330 can be captured by the sensor 322 and collected by data collection module 328. Imaging data 330 can include measuring relative intensity of the stray-light versus the pixels of the two-dimension image for sensor 322.

After collecting the imaging data for the particular light intensity, the beam 312 can be blocked from reaching the optical receiver assembly 308, e.g., using a shutter or other deflection method. A next light intensity of the multiple intensities of light can be selected to test, e.g., using a different filter 118 and/or dimming an intensity of light source 120. For example, an optical density 3.0 ND filter 118 can be inserted into the optical path 314 using a filter wheel of the illumination assembly 306 to reduce the light intensity of the light source.

Data related to the particular light intensity, e.g., a particular ND filter being used, or an intensity reduction of the light source, can be communicated to the data collection module 328 to incorporate as meta-data with the collected imaging data 330 for the particular light intensity. In some implementations, meta-data includes wavelength(s) of light being tested, and characteristics of the lens module 332 and/or sensor 322 under test using the stray-light testing station 302.

A number of different light intensities from multiple possible light intensities is measured through the process, as described in steps 702-708 above (710). Multiple light intensities can be measured by attenuating the intensity of the light source using multiple calibrated ND filters each having a different optical density value and/or lowering an exposure of the sensor 322. The number of different light intensities to be measured can be, for example, 4 or more different light intensities, 2 or more different light intensities, or the like. For example, if the relative intensity of 1 is captured with an ND filter of optical density value of 5.0, the extent of the light sources at relative intensities equal to 10' and $10^{-5}$ of the non-attenuated light source can be measured using ND filters having optical density (OD) 1.0 and OD 0.0, respectively.

Performance metrics are determined, from the imaging data, for the optical receiver assembly (712). After each intensity of the multiple intensities is exposed to the optical receiver assembly 308 including lens module 332 and sensor 322, performance metrics are determined based on the captured images. Performance metrics characterize the performance of the camera under stray-light conditions, e.g., a glare spread function.

Performance of the camera can be quantized by a rejection ratio where the rejection ratio measures a radial extent of light at a ratio below an original source intensity, e.g., using the multiple reduced intensities of the spatially extended light source 312. The rejection ratio calculates the extent of the light source with an intensity above a specified relative intensity over a two-dimensional (2D) image captured by sensor 322. In the example presented above with reference to step 710, the intensity of the light source can be attenuated with multiple calibrated ND filters and/or lowering an exposure of the sensor 322 to capture a relative intensity of 1 with an ND filter of optical density value of 5.0 such that the extent of the light sources at relative intensities equal to $10^{-4}$ and $10^{-5}$ of the non-attenuated light source can be measured using ND filters having optical density (OD) 1.0 and OD 0.0, respectively. The extent of the source in the 2D image is then measured as the radius of the farthest extent from a center point of the source. The rejection ratio measurements can be used to define an extended source rejection ratio (ESRR).

In some implementations, performance of the camera can be quantized by a glare spread function describing the spatial effects of the spatially extended light source on lens module 332 and sensor 322, where stray-light causes the light source to spread over the sensor 322 at high intensities. Multiple orders of magnitude of light intensity are measured by attenuating the light source, e.g., using multiple ND filters with different optical densities. An image is captured at each attenuated light intensity and a plot of relative intensity versus camera pixels is generated.

Performance metrics determined based on the process 700 can be utilized to compensate for stray-light conditions of a camera on a vehicle under nominal operating conditions. For example, performance metrics can be used to compensate for glare from the sun when the sun is within the field of view of the camera. In another example, performance metrics can be used to compensate for saturation of a camera by an infrared light source, e.g., when a LIDAR system for an autonomous or semi-autonomous vehicle is utilizing an 850 nm light source in LIDAR detection.

Performance of the various components of the optical receiver assembly, e.g., the lens module, enclosure, PCB mount, sensor, etc., can be analyzed to isolate the origin of stray light at a particular angle. Stray light performance can be improved for the optical receiver assembly by utilizing design choices, e.g., lens redesign, coatings/materials, surface blacking, additional baffling of the optical components, or the like.

In some implementations, a range of angles can be measured using the process 700 described above. For example, an alignment of the optical receiver 308 of the stray-light testing station 302 can be adjusted to position the optical path 314 with respect to a field of view 316 of the lens module 332 under test at a different angle of incidence 320. In some implementations, adjusting an angle of incidence of the optical path to the field of view of the lens module can be performed by using one or more rotational stages 318a, 318b of the optical receiver assembly 308.

In some implementations, performance of a camera under stray-light conditions for multiple light sources can be tested by the stray-light testing station 302. For example, light source 120 as described with reference to FIG. 1 can include multiple different light sources, for example, a broadband 6500 k source and an infrared 850 nm source can be incorporated into light source 120 where each light source in turn can be utilized in the illumination assembly 102, e.g., where liquid light pipe 122 can be adjusted to direct light from the different light sources into optical elements 104 or a different liquid light pipe 122, e.g., that is compatible with a particular wavelength(s) of the light source 120, can be used for each light source 120 to direct a light source 120 being utilized into optical elements 104.

In some implementations, the stray-light testing station can be using to measure chromatic aberration of a lens and how chromatic aberration can generate stray-light effects in a lens module and/or camera module.

In some implementations, the stray-light testing station can include a hyperspectral light source to measure wavelength dependence of stray-light effects on a lens module and/or camera module.

Though described above with reference to FIGS. 1-6 as a fixed illumination assembly and adjustable optical receiver assembly, in some embodiments, the optical receiver assembly is fixed in position while the illumination assembly can be positioned on multiple axes. In some embodiments, the illumination assembly and optical receiver assembly can each be positioned on respective axes with respect to one another.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CDROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a backend component, e.g., as a data server, or that includes a middleware component, e.g., an application server, or that includes a frontend component, e.g., a user computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus comprising:
   an illumination assembly comprising a light source and one or more optical elements arranged to direct a beam of light from the light source along an optical path, the one or more optical elements comprising a parabolic mirror arranged in the optical path and one or more neutral density filters;
   an optical receiver assembly comprising a sensor and a lens receptacle configured to receive a lens module comprising one or more lenses and position the lens module in the optical path downstream from the parabolic mirror so that the lens module focuses the beam of light from the light source to an image plane of the sensor; and
   a moveable frame supporting the optical receiver assembly or the illumination assembly, the moveable frame comprising one or more adjustable alignment stages, wherein the adjustable alignment stages position the optical receiver assembly relative to the illumination assembly such that the optical path of the illumination assembly is within a field of view of the optical receiver assembly.

2. The apparatus of claim 1, wherein a diameter of the beam of light at the parabolic mirror is larger than a lateral dimension of the parabolic mirror.

3. The apparatus of claim 1, wherein an angular extent of the light source is selectable between 0.1° and 5° degrees.

4. The apparatus of claim 3, wherein the angular extent of the light source is 0.5° degrees.

5. The apparatus of claim 1, wherein the light source is a light-emitting diode broad spectrum source, an infrared source, or a hyper-spectral source.

6. The apparatus of claim 1, wherein the one or more optical elements comprise a light pipe configured to receive light from the light source and direct a beam of light from the light source to the optical receiver assembly.

7. The apparatus of claim 6, further comprising a second light source, wherein the light pipe is configured to selectively receive light from the light source or the second light source and direct the beam of light from the light source or a beam of light from the second light source to the optical receiver assembly.

8. The apparatus of claim 1, further comprising a control unit in data communication with the illumination assembly and optical receiver assembly, and operable to perform operations of measuring a performance metric.

9. The apparatus of claim 1, wherein the optical receiver assembly comprises an adjustable receptacle configured to receive a camera module and position the camera module in the optical path downstream from the parabolic mirror so that the beam of light from the illumination assembly is focused to an image plane at the camera module.

10. The apparatus of claim 1, wherein the adjustable alignment stages can be adjusted in one or more dimensions to position the optical receiver assembly or the illumination assembly over a range of angles.

11. A method for determining a performance metric of an optical receiver assembly comprising:
    aligning, using one or more adjustable alignment stages, the optical receiver assembly comprising one or more lenses in an optical path downstream from an illumination assembly comprising a light source and one or more optical elements arranged to direct a beam of light from the light source along the optical path, the one or more optical elements including a parabolic mirror, wherein aligning the optical receiver assembly comprises focusing the beam of light from the light source of the illumination assembly to an image plane of a sensor of the optical receiver assembly;
    selecting a first light intensity for the light source from a plurality of different light intensities, wherein selecting the first light intensity of the plurality of different light intensities from the light source comprises attenuating the beam of light from the light source using a neutral density filter;
    exposing the optical receiver assembly to the beam of light from the light source at the first light intensity;
    capturing image data by the sensor of the optical receiver assembly while exposing the optical receiver assembly to the beam of light at the first light intensity; and
    determining, based on the captured image data, the performance metric for the optical receiver assembly.

12. The method of claim 11, wherein determining the performance metric comprises:
    determining a stray-light performance of the optical receiver assembly over a plurality of incident angles of the light source within a field of view of the optical receiver assembly.

13. The method of claim 11, wherein determining the performance metric comprises determining a spread of the beam of light from a center point of the light source.

14. The method of claim 13, wherein the spread of the beam of light from the center point of the light source comprises a radial spread of the beam of light from the center point of the light source.

15. The method of claim 13, wherein determining the performance metric further comprises:
    determining, for the plurality of different light intensities, a respective spread of the beam of light from the center point of the light source.

16. The method of claim 15, wherein the performance metric comprises a glare spread function for the optical receiver assembly.

17. The method of claim 15, wherein the performance metric comprises a rejection ratio for the optical receiver assembly.

18. The method of claim 11, wherein aligning the optical receiver assembly comprises adjusting the adjustable alignment stages in one or more degrees of freedom to position the optical receiver assembly over a range of angles.

19. The method of claim 11, wherein the one or more optical elements comprise a light pipe, and wherein the methods comprise:
coupling the beam of light from the light source into the light pipe to direct the beam of light along the optical path.

20. The method of claim 19, further comprising, selectively coupling the beam of light from the light source or a beam of light from a second light source into the light pipe to direct the beam of light from the light source or the beam of light from a second light source along the optical path.

* * * * *